UNITED STATES PATENT OFFICE.

WILLIAM B. D. PENNIMAN, OF BALTIMORE, MARYLAND, ASSIGNOR, BY MESNE ASSIGNMENTS, TO WHITNEY YEAST CORPORATION, OF BOSTON, MASSACHUSETTS, A CORPORATION OF NEW YORK.

METHOD OF MAKING DRY YEAST.

1,386,361.   Specification of Letters Patent.   Patented Aug. 2, 1921.

No Drawing. Application filed March 6, 1918, Serial No. 220,803. Renewed June 10, 1921. Serial No. 476,605.

*To all whom it may concern:*

Be it known that I, WILLIAM B. D. PENNIMAN, a citizen of the United States of America, residing in the city of Baltimore, State of Maryland, have invented certain new and useful Improvements in Methods of Making Dry Yeast, of which the following is a specification.

This invention relates to the art of manufacturing commercial dry yeast, that is yeast from which the moisture has been abstracted, leaving only sufficient to sustain the life of the yeast cells but not enough to permit putrefactive fermentation at ordinary temperatures. The invention is in the nature of an improvement having as an object the production of a dry yeast which will keep for long periods retaining a high percentage of live yeast cells and hence great capacity for quick revivification.

This application is the property of the owners of the Whitney Patent No. 1,306,569, dated June 10th, 1919, and the process herein described was developed conjointly with the process covered in that patent.

To produce such yeast, I prepare a medium for yeast culture according to any well-known and preferred method. The following has been found to be a suitable formula:

One hundred pounds of crushed barley malt are steeped in fifty gallons of water at a temperature of 150° F., for one and one-half hours or longer. The liquid portion is then drawn off and thirty gallons of water are added to the remaining malt and the mixture is maintained at a temperature of 200° F. for one hour. The liquor is then drawn off from the spent malt and added to the first liquor. The mixed liquor is then boiled until the saccharometer shows a strength of 10°. The liquor is then strained and is ready for use. Bring the liquor to the boiling point and add two and one-half pounds of cereal flour, preferably hard wheat flour, to each gallon of the liquid. When further reduced by cooling to 85° F., add to the mass, alcoholic yeast in the proportion of one ounce of yeast cells counted dry to each gallon of the mixture and maintain the temperature at 85° for forty-eight hours. If desired the amount of water in the above fermentation mixture may be considerably increased to make the fermentation more rapid. When the fermentation is completed, add cereal flour, such as corn meal, until the mixture acquires the consistency of soft dough. The mass is then forced through a wire cloth sieve of suitable mesh to properly comminute the same, by first forming threads which are readily broken and converted into granules. The granulated material is then subjected to evaporation in vacuum at a low temperature, as 50° to 60° F., to prevent any considerable fermentation, the vacuum being preferably the highest which can be obtained with an ordinary commercial pumping apparatus. This makes drying at a low temperature possible and has no injurious effect on the yeast cells, 80 to 95% of the yeast cells being in a viable condition after the product has been kept several weeks. Such drying is continued until the product contains less moisture than will cause putrefactive fermentation at ordinary temperatures, and more moisture than is necessary to retain the vitality of the live cells, preferably 10%; a little less or a little more will accomplish the result.

The culture here described is substantially the same as that described in U. S. Patent No. 40,454 to J. T. Alden, dated November 3rd, 1863.

The invention of Alden went into rather extensive commercial use for making "sponge" which was added to dough in making bread, in which case the fermentation was effected by a double operation. This was done because it was found that Alden's yeast was not strong enough to effect the fermentation of the dough by a single operation. By my method of drying, the yeast retains a much increased percentage of live yeast cells which are so much improved in vitality that my yeast is preferably used in fermenting dough by a single operation.

Having thus described my invention, what I claim and desire to secure by Letters Patent is:

1. In the art of making dry commercial yeast, the improvement which consists in making a liquid culture of alcoholic yeast, adding thickening material to the fermented liquid and granulating the mixture and desiccating it *in vacuo* until it contains about ten per cent. moisture.

2. In the art of making dry commercial yeast, the improvement which consists in making a liquid culture of alcoholic yeast, adding flour to the liquid to convert it into a paste and evaporating the thickened material *in vacuo* until it contains only sufficient moisture to preserve the yeast cells and less moisture than will cause putrefaction.

3. In the art of making dry commercial yeast, the improvement which comprises adding a filler to the liquid culture and evaporating the total contents of the yeast culture *in vacuo* at a low temperature, until it contains less moisture than will cause putrefactive fermentation and more moisture than is requisite to maintain the vitality of the yeast cells.

Signed by me at Baltimore, Maryland, this 1st day of March, 1918.

WILLIAM B. D. PENNIMAN.

Witnesses:
ZELLA KUHN,
ALICE G. DONEGAN.